(12) United States Patent
Bauer

(10) Patent No.: US 7,918,183 B2
(45) Date of Patent: Apr. 5, 2011

(54) PROTECTIVE COVER FOR A MOTORIZED VEHICLE ENGINE HOOD

(76) Inventor: Ross W. Bauer, Clovis, CA (US)

( * ) Notice: Subject to any disclaimer, the term of this patent is extended or adjusted under 35 U.S.C. 154(b) by 988 days.

(21) Appl. No.: 10/790,376

(22) Filed: Mar. 1, 2004

(65) Prior Publication Data

US 2005/0217588 A1    Oct. 6, 2005

(51) Int. Cl.
*A01K 29/00* (2006.01)

(52) U.S. Cl. ...................................................... 119/28.5

(58) Field of Classification Search ................ 119/28.5, 119/711, 171–174, 452, 482, 496, 497, 498, 119/771; 5/417, 420, 700, 938, 954; D30/118; D6/597, 601
See application file for complete search history.

(56) References Cited

U.S. PATENT DOCUMENTS

| | | | | |
|---|---|---|---|---|
| 3,665,355 A * | 5/1972 | Sasaki et al. .................. 335/306 |
| 4,892,769 A * | 1/1990 | Perdelwitz et al. ................ 5/417 |
| 5,144,911 A * | 9/1992 | Moore et al. .................. 119/28.5 |
| 5,158,324 A * | 10/1992 | Flesher ............................. 428/31 |
| 5,363,804 A * | 11/1994 | McAlister ..................... 119/28.5 |
| D368,335 S * | 3/1996 | St. John ......................... D30/118 |
| D375,596 S * | 11/1996 | Laughlin ......................... D32/71 |
| 5,718,191 A * | 2/1998 | O'Donnell ...................... 119/771 |
| 6,237,531 B1 * | 5/2001 | Peeples et al. ............... 119/28.5 |
| D447,607 S * | 9/2001 | Kaplan ........................ D30/118 |
| 6,294,240 B1 * | 9/2001 | Brunetto .......................... 428/99 |
| D465,687 S * | 11/2002 | Sandbeck ....................... D6/597 |
| 6,622,652 B1 * | 9/2003 | Wang ........................... 119/28.5 |
| 6,751,816 B1 * | 6/2004 | Wechsler ........................... 5/417 |
| 2004/0000373 A1 * | 1/2004 | Tweel et al. ........................ 2/16 |
| 2005/0055886 A1 * | 3/2005 | Sharapov ............................. 52/3 |
| 2005/0070190 A1 * | 3/2005 | Yang ............................. 442/268 |

* cited by examiner

*Primary Examiner* — Thomas Price
(74) *Attorney, Agent, or Firm* — Patrick Reilly

(57) ABSTRACT

A protective cover for an automobile or truck motor protective hood is provided. The cover may be a blanket that is attractive to animals, such as cats, and be pleasant to rest on, paw and chew. The cover may be shaped in a square, a rectangle, a circle, or in an outline of a cartoon character or a team or corporate logo. An image, picture, photo, signage or a logo may be visibly displayed on at least one side of the fabric. The cover may have a pillow section.

19 Claims, 9 Drawing Sheets

Optional surface for emblem

Emblem Region

Stuffing

PROTECTIVE COVER FOR A MOTORIZED VEHICLE ENGINE HOOD

FIELD OF THE INVENTION

The present invention relates to the protection of heat generating structure from damage by animals. More particularly, the present invention relates to providing a protective material that may be sensually pleasing, i.e. pleasant, to an animal but also protects a surface of a heat emitting structure from damage caused by the animal.

BACKGROUND OF THE INVENTION

Many animals are attracted to heat emitting structures or equipment. In particular, most cats and dogs, whether domesticated, wild or feral, typically enjoy lying on heat emitting surfaces, such as the protective hoods of motor vehicles, when the outside air temperature is cool. Unfortunately, animals resting on certain heat emitting surfaces can damage the surface by scratching or biting the surface. Owners or guardians of heat emitting equipment or structures are thus rightly concerned that the attraction of animals to the equipment or structure may result in damage to the equipment or structure. This potential damage may be aesthetic only, as in visible paint scratches, or may be more severe in effect, such as encourage rusting or loss of structural integrity of a surface or protective cover. In addition, as animals often engage in repetitive behavior, by intentionally or by accident, permitting a cat or dog to rest on a heat emitting structure even once may heighten the probability of continual attempts by the animal to gain access to the structure.

Conversely, pet owners are typically pleased to see a pet pleasantly resting on a warm surface. The sympathy of the pet owner for a pet may inhibit the pet owner from denying access to a warm surface, such as hood of a motor vehicle heated by the motor of the vehicle. In addition, pet owners often enjoy providing toys and materials that enhance the lives of their pets. Observing the attractiveness of these pet toys and materials to the pet may provide a sense of satisfaction and pride to the pet owner. The aesthetic value to humans of the pet toy or material may also be of value to the pet owner, as a pleasing design or appearance of the toy or material may be appreciated by other persons or by the pet owner.

There is, therefore, a long felt need to protect the surface of a heat emitting equipment or structure from damage caused by animals attracted by the heat. In addition, there is a long felt need to provide products that pet owners can use to increase the perceived quality of life of a pet or other animal.

OBJECTS OF THE INVENTION

It is an object of the present invention to provide a removable material that protects a surface from damage caused by the claws or teeth of an animal.

It is an additional optional object of the present invention to provide a blanket that may rest on and protect a surface.

It is a further optional object of certain preferred embodiments of the present invention to provide a sheet of fabric that may rest on and protect a surface.

It is another optional object of certain alternate preferred embodiments of the present invention to provide a means to removabley attach a material to a surface, wherein the material substantially protects a surface from damage that could be caused by the claws or teeth of an animal.

It is yet another optional object of certain still alternate preferred embodiments of the present invention to provide a fabric sheet that at least partially covers a motor or engine hood of a motorized vehicle, wherein the fabric sheet substantially protects the hood from damage that could be caused by the claws or teeth of an animal.

It is a still additional optional object to provide a means to removabley attach a fabric sheet, wherein the fabric sheet at least partially covers a motor or engine protective hood of a motorized vehicle, whereby the fabric sheet substantially protects the hood from damage that could be caused by the claws or teeth of an animal.

SUMMARY OF THE INVENTION

These and other objects will be apparent in light of the prior art and this disclosure. The present invention optionally provides in a first preferred embodiment a cover or pad having a fabric pleasing to at least certain animals. The fabric may optionally have a tactile quality pleasing to, i.e. pleasant to, a plurality of cats or dogs. In addition the first preferred embodiment, or first version may optionally include substances having a tactile quality, smell or taste pleasing to at least certain animals, or substances providing medical or health benefits, such as pesticides or a deodorizer. Certain still alternate preferred embodiments may include a fleece material. Certain yet alternate preferred embodiments of the present invention may optionally have a high urine sorbency. The first version may have a width and a length less than one foot each or greater than ten feet each, or more optimally four feet by four feet. The first version may comprise a fabric having a thickness of approximately one inch or less, and a length and width defining a quadrilateral, a rectangle, a diamond, a circle, an ellipse, or a cartoon character, logo or signage. The terms cover and pad are defined as synonyms within this disclosure.

Certain alternate preferred embodiments of the present invention provide a cover or pad that presents various thicknesses as defined by a thinned section and a pillow section optional surface to display signage, e.g., a cartoon, a team logo, and a corporate symbol.

Certain still alternate preferred embodiments of the present invention may further optionally comprise an attachment means, e.g. hook and loop fasteners, strapping, suction cups, magnets, and/or an adhesive, or other suitable attachment means known in the art, wherein the attachment means removabley couples the certain still alternate preferred embodiment to a vehicle or to an other heat emitting equipment.

A second preferred embodiment of the present invention, or second version, is comprised within an optional roll-up design, wherein the roll-up design enables rolling up a fabric of the second design for storage. The second design may further optionally provide and include a hook and/or an aperture, wherein the hook and aperture each enable a convenient hanging of the second design for airing out the second version and/or for vertical storage of the second design.

Various alternate preferred embodiments of the present invention may comprise easy to clean materials, light weight fabrics, heat retaining materials, and surfaces that visually present a corporate signage or loge, an organizational signage or logo, an association's signage or logo, a sports team's signage or logo, and/or a personalized image.

Other aspects of the present invention include a method, system and a computer-readable medium configured to carry out the foregoing steps. The foregoing and other objects, features and advantages will be apparent from the following description of the preferred embodiment of the invention as illustrated in the accompanying drawings.

BRIEF DESCRIPTION OF THE DRAWINGS

These, and further features of the invention, may be better understood with reference to the accompanying specification and drawings depicting the preferred embodiment, in which: These, and further features of the invention, may be better understood with reference to the accompanying specification and drawings depicting the preferred embodiment, in which.

DETAILED DESCRIPTION OF A PREFERRED EMBODIMENT

In describing the preferred embodiments, certain terminology will be utilized for the sake of clarity. Such terminology is intended to encompass the recited embodiment, as well as all technical equivalents, which operate in a similar manner for a similar purpose to achieve a similar result.

Figure 1A:
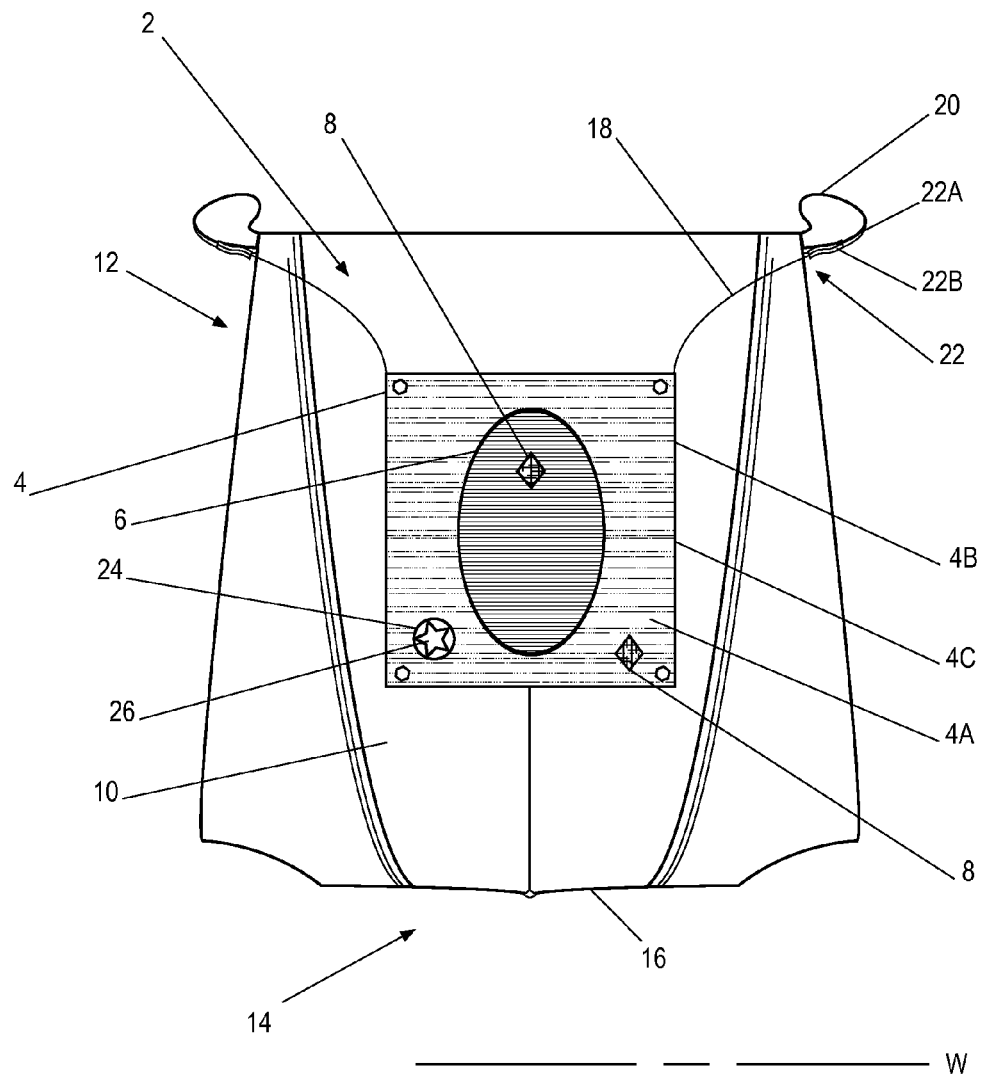
FIG. 1A is an illustration of a first preferred embodiment of the present invention, or first version.
Figure 1B:
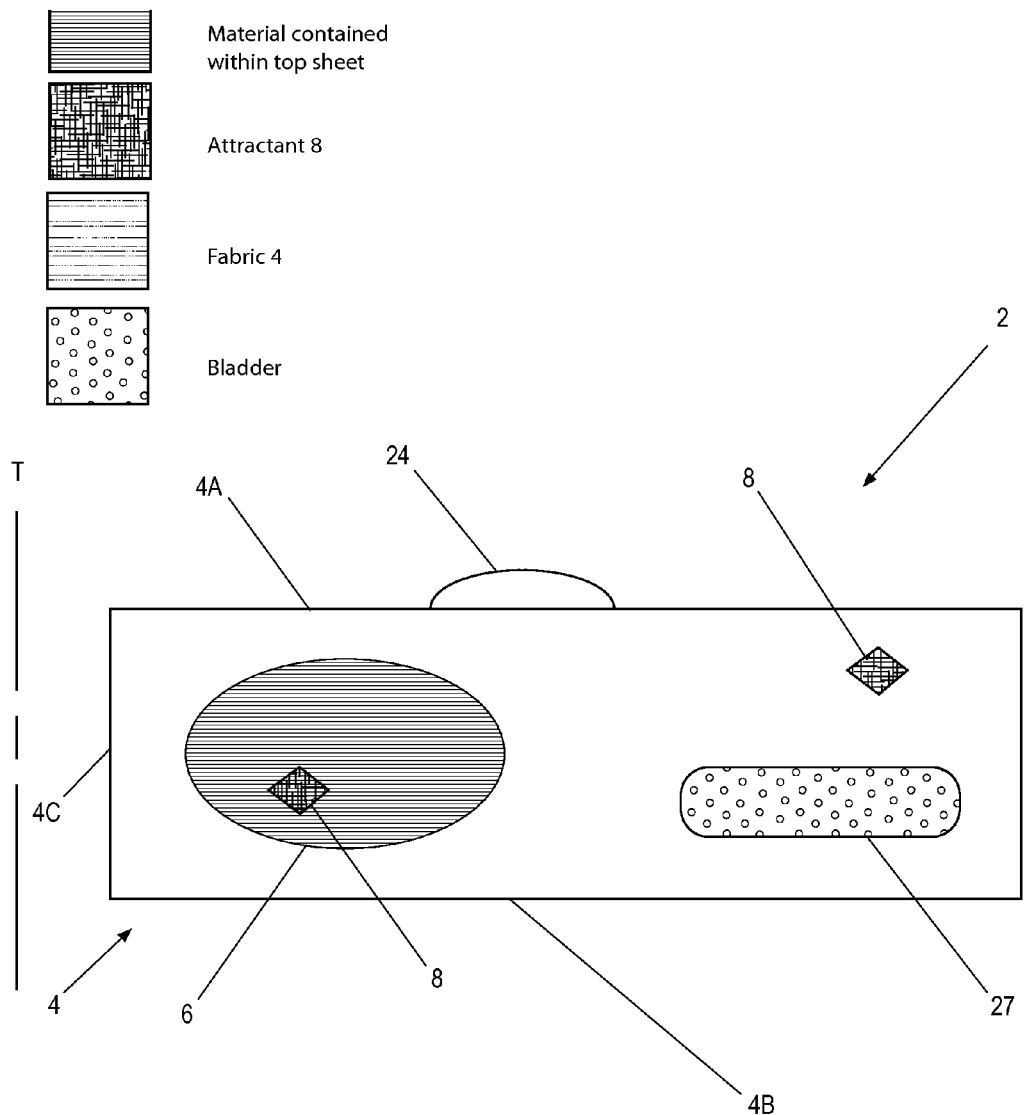
FIG. 1B is a side view cut-away view of the first version of FIG. 1A.

Referring now to the Figures and particularly to FIG. 1A and FIG. 1B, FIG. 1A is an illustration of a first preferred embodiment of the present invention, or first version 2. The first version 2, or cover 2, or pad 2, includes a fabric 4 made of cotton or felt, or other suitable fabric known in the art. The fabric 4 may optionally be, or include material 6, selected for being known in the art as pleasing to at least certain animals or many individual animals of selected species of animals, e.g., cats and dogs. The material 6 may be compressible and allow an animal to play with the material 6 and enjoy pressing down the material 6 and batting or pawing the material 6, such as a stuffing material trade named as CLUSTER STUFF, marketed by CREATE A CRAFT, or other suitable stuffing material known in the art. The material 6 may be housed within a top sheet 4A and a bottom sheet 4B of the fabric 4. The fabric 4 may further additionally, alternatively or optionally include substances 8 known in the art to often or typically attract or be pleasing to certain animals or animal species. For example, substance 8 may be a natural or synthetic catnip, as known in the art and selected to attract and please a cat to lie upon and rest or play on the first version 2. Alternatively or additionally, the substance 8 may be a pesticide, or other medicinal, herbal or beneficial substance known in the art. The quality of the material 8 known in the art to be typically or occasionally pleasing to an animal of a selected species, such as a dog or a cat, may be a taste, a texture, and/or a smell. More particularly, the quality of the material 8 may be optionally be a tactile quality pleasing to a plurality of cats. The top sheet 4A and the bottom sheet 4B and are coupled together along a seam 4C, the top sheet 4A and the bottom sheet 4B being coupled along seam 4C by adhesion, by sewing materials or other suitable means known in the art. Other desirable properties for the fabric 4 include hypoallergenic or antiallergenic, durable, water repellent or water resistant, light in weight, easy to clean, low in cost, easily attainable, easily repairable and easy to manage in a manufacturing operation.

The fabric 4 may be shaped substantially as a relatively thin, orthogonal sheet and having a thickness measured along a T axis of less than one inch to more than six inches, a width measured along a W axis of from less than one foot to more than ten feet, and a length measured along an L axis from less than one foot to more than ten foot. A planar shape of the fabric 4 is defined in the area within a plane defined by the substantially orthogonal W and L axes. Alternatively, the fabric 4 may be configured, sized and shaped in substantive conformance with suitable pet, cat or dog blankets or cushions known in the art. The fabric 4 is preferably configured to cover at least part of the surface 10 of a vehicle 12, and in particular at least part of the surface front end 14 of the vehicle 12, to include a motor protective hood 16, or hood 16, of the front end 14. It is understood that the term engine or motor is defined herein to describe any heat emitting equipment used to power a vehicle. A strap 18 is attached to fabric 4 and extends from fabric 4 to a side view mirror housing 20 of the vehicle 12. A hook and loop fastener assembly 22 of the strap 18 is used to removabley secure the strap 18 about the mirror housing 20, and to thereby removabley attaché the first version 2 to the vehicle 12. The hook and loop fastener assembly 22 includes a hook strip 22A and a loop strip 22B.

Where a motor (not shown) of the vehicle 12 is not located within or proximate to the front end 14, the first version may be configured to at least partially cover another part of surface 10 of the vehicle 12, such as where the surface 10 is proximate to a motor located within a rear end (not shown) of the vehicle 12, wherein the partial area of the surface 10 covered by the first version 2 is located proximate to the motor.

The fabric 4 may be shaped along the W and L axes to present one of various shapes, to include rectangular, diamond-shaped, round, a corporate logo or signage, or shaped like a cartoon character or other shape representative of an organization, association or other entity. The fabric 4 may further optionally include an optional surface 24 to display signage 26 or a logo, e.g., a cartoon, a team logo, an association logo, and a corporate symbol.

Referring now to the Figures and particularly to FIG. 1A and FIG. 1B, FIG. 1B is a side view cut-away view of the first version of FIG. 1A. Fabric 4 includes the top sheet 4A and the bottom sheet 4B. Surface 24 is coupled with top sheet 4A. Surface 24 may simply be a portion of top sheet 4A, marked to visually present signage 20, or it may be an additional material or layer of material, such as a plastic material, or other natural or synthetic material known in the art for visually presenting images in two or three dimensions. The material 6 is housed between and contained within top sheet 4A and bottom sheet 4B. Substance 8 may optionally be seeded, impregnated, attached, or otherwise coupled with fabric 4 and material 6. An inflatable bladder 27 may be inflated by a user to establish a more comfortable resting place for a dog, cat or other pet. The bladder 27 may be formed of a suitable rubber, plastic, vinyl, rayon, or other suitable natural or synthetic material or fabric. It is understood that the term material is defined herein to include fabrics, particles, beads, threads, sheets, cloths, and textiles.

Figure 2:
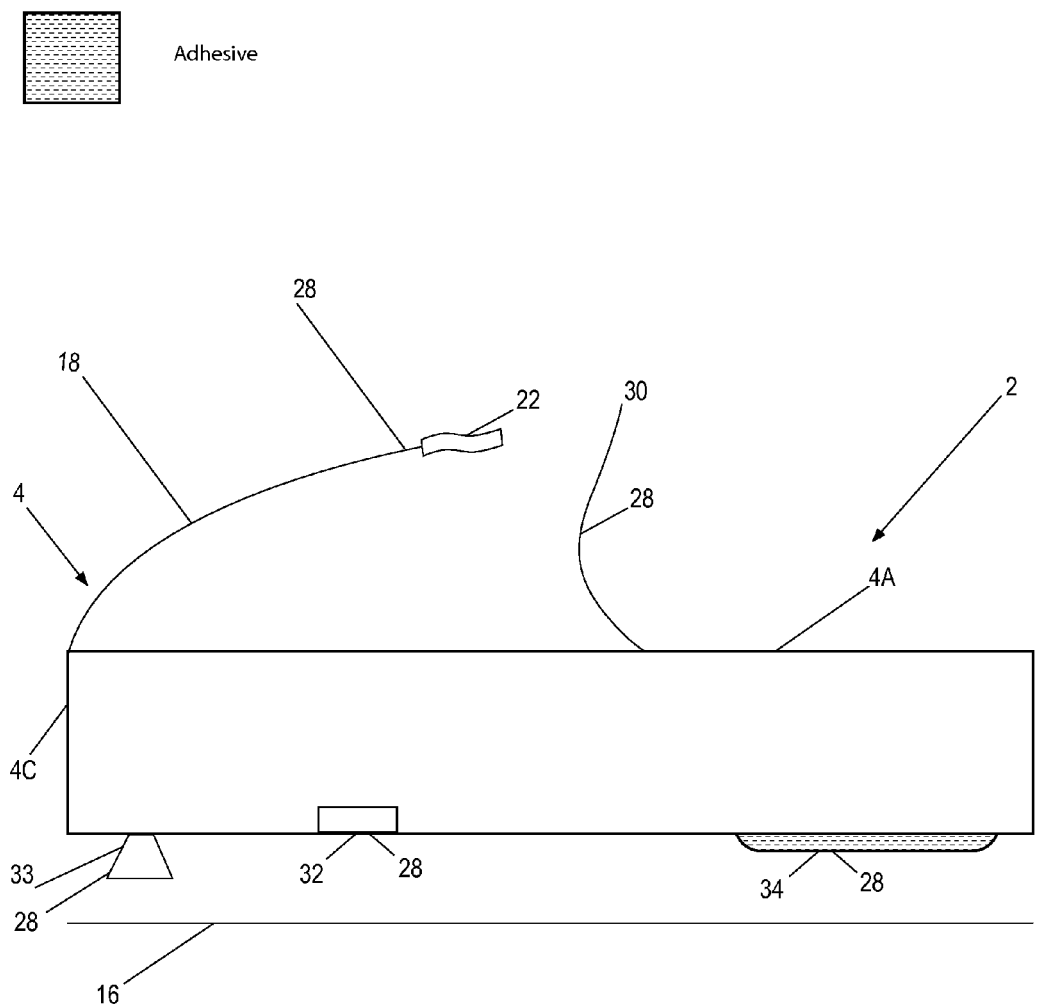
FIG. 2 is a schematic diagram of the first preferred embodiment of the present invention of FIG. 1 attached to a motor protective hood.

Referring now to the Figures and particularly to FIG. 2, FIG. 2 is a schematic diagram of the first version 2 of FIG. 1 attached to the hood 16. An attachment means 28 removabley couples the fabric 4 to the vehicle 12 or the hood 16. The attachment means 28 may be or comprise the strap 18 with hook and loop fastener assembly 22, strapping 30, magnets 32, suction cups 33, and/or an adhesive 34. The hook and loop fastener assembly 22 may be or comprise an assembly of VELCRO hook and loop fasteners. The magnets 32 may be enclosed with the fabric sheets 4A and 4B in order to protect the surface 10 of the vehicle 12 from scratching the surface 10 when the magnets 32 are moved against the surface 10. The magnets 32 may be or comprise metallic or nonmetallic magnets. The suction cups 32 may be a suitable soft plastic or other suitable material known in the art that may be removabley attached by suction to a painted metallic surface and without substantially marking, marring, or discoloring the painted metal surface.

The strapping 30 may be a string, cord or length of material that is attached to the fabric 4 and can be removabley attached to the vehicle. In certain preferred embodiments the strapping 30 can be tied to a vehicle feature, such as a hood ornament or a radiator grill. The adhesive 34 is chosen from adhesives known in the art that may repeatedly and removabley attach a material to a painted metal surface and without substantially marking, marring, or discoloring the painted metal surface.

The top sheet 4A may be a urine absorbent material. Top sheet 4A may additionally or alternately be a soft material comfortable to a plurality of cats or dogs, such as fleece, wool or cotton or other suitable material known in the art. In certain alternate preferred embodiments of the present invention the bottom sheet 4B may be a pliable material and impermeable to urine, such as a suitable natural or synthetic rubber, or other suitable material known in the art.

Figure 3:
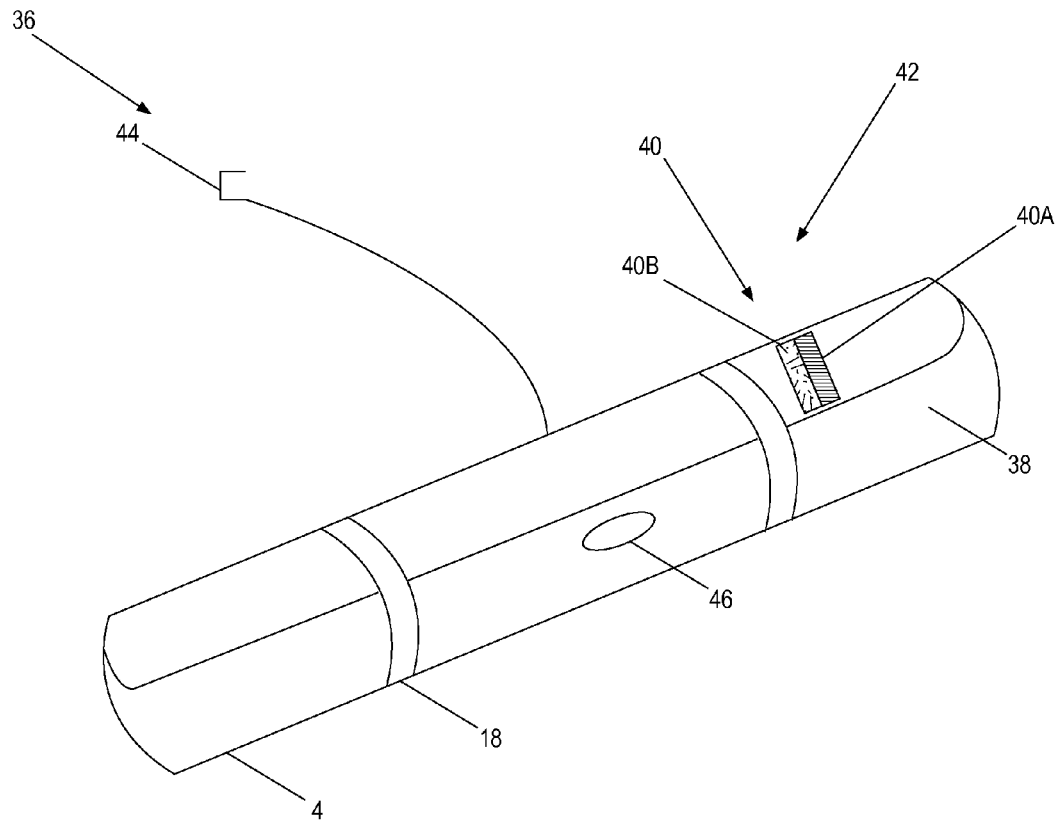
FIG. 3 is an illustration of a second preferred embodiment of the present invention, or second version.

Referring now to the Figures and particularly to FIG. 3 is an illustration of a second preferred embodiment of the present invention 36, or second version 36, is configured within an optional roll-up design that is convenient for storage of the second version 36. The strap 18 is looped around the fabric 4 as presented in a rolled up form. An optional second strap 38 having a second hook and loop assembly 40, with a hook strip 40A and a loop strip 40B is additionally useful in supporting the strap 18 in maintaining the fabric 4 in the storable position 42. An optional hook 44 and optional aperture 46 provide the second version 36 with separate features that enable a convenient hanging of the second version 36, whereby the fabric 4 may be aired out and stored in a vertical position.

Figure 4A:
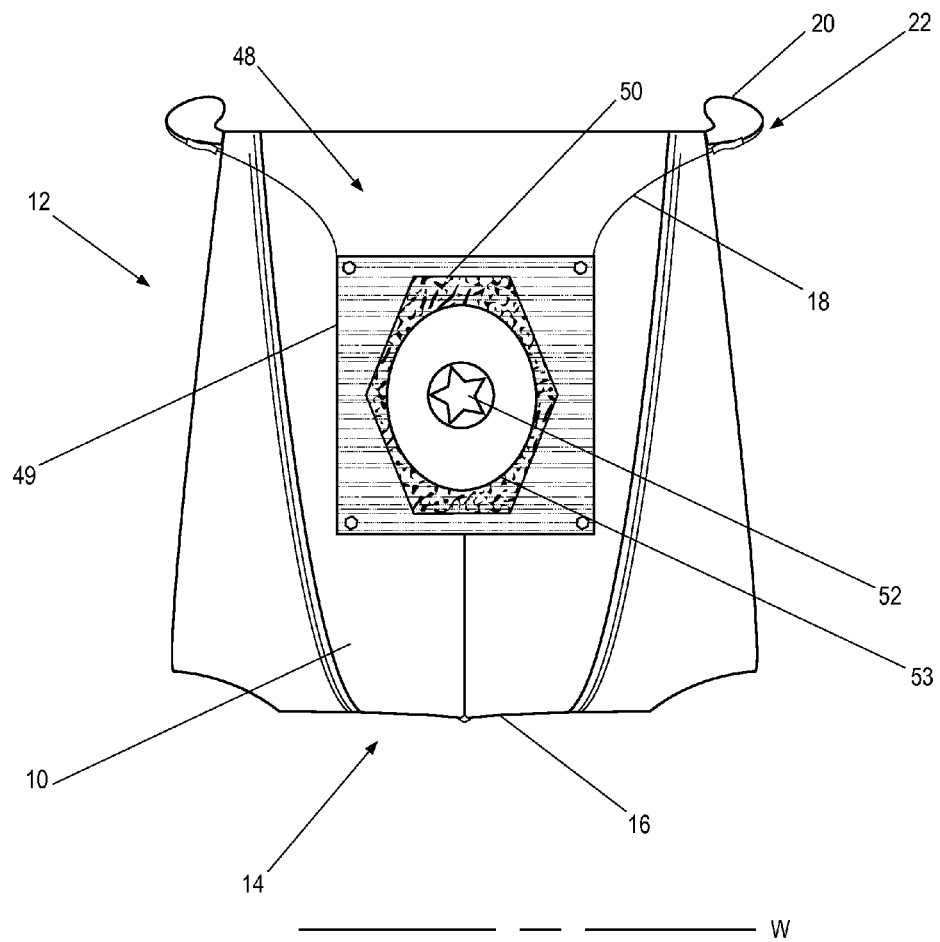
FIG. 4A is an illustration of a third preferred embodiment of the present invention, or third version, the third version having region displaying a visual image.
Figure 4B:
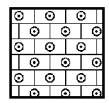
FIG. 4B is a side view of the third version of FIG. 4A.
Figure 4B:
Figure 4B:
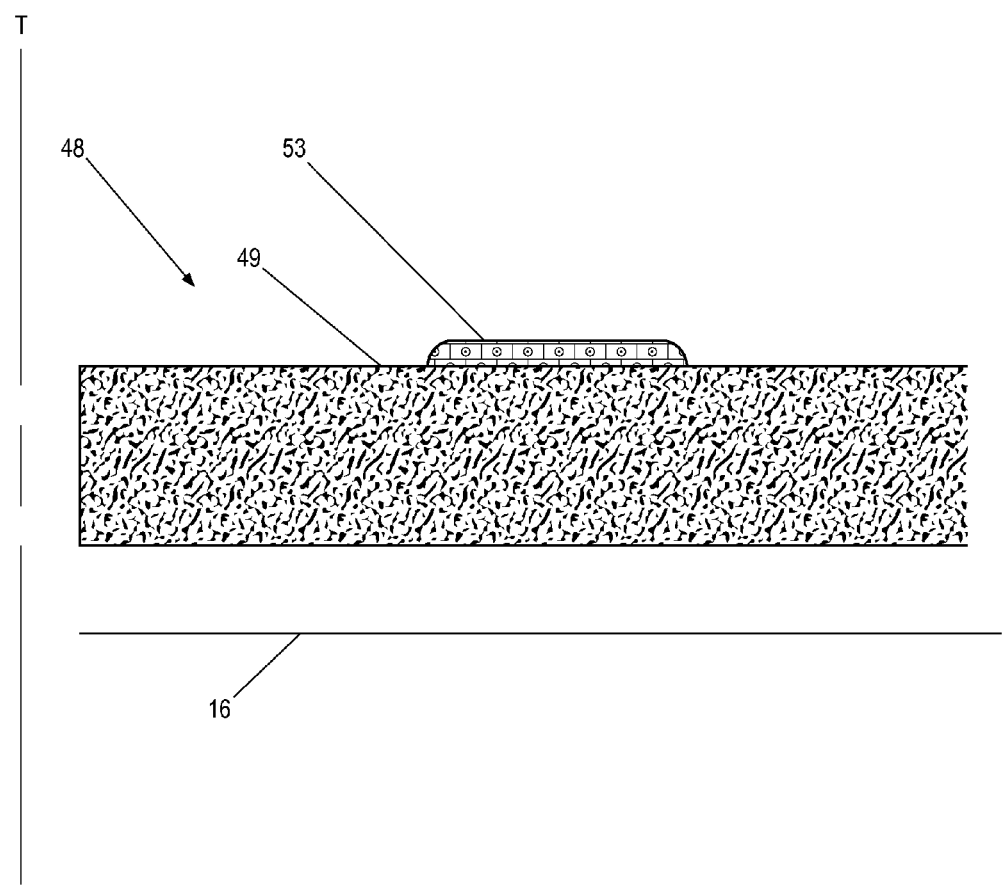

Referring now to the Figures and particularly to FIG. 4A and FIG. 4B, FIG. 4A is a front view of a third preferred embodiment of the present invention 48, or third version 48, the third version having an alternate fabric 49 comprising a region 50 displaying a visual image 52, and FIG. 4B is a side view of the third version 48. The third version 48 and the alternate fabric 49 may be comprised of easy to clean materials, such as a suitable cotton, rayon, nylon, latex, vinyl, or other suitable natural or synthetic materials or fabrics known in the art. Alternatively or in addition the alternate fabric 49 of the third version 48 may comprise light weight materials, such as plastic or wool. An optional surface 53 coupled with the alternate fabric 49 and comprised within the third version 48 is used to display at least one, optionally personalized, design or signage 52. The optional surface 53 may include a suitable cotton, wool, rayon, nylon, latex, vinyl or other suitable natural or synthetic material or fabric known in the art useful for displaying visual images. The third version 52 may optionally include heat retaining materials, such as wool, in order to sustain provide more warmth for a longer period of time to an animal using the third version 48.

Figure 5:
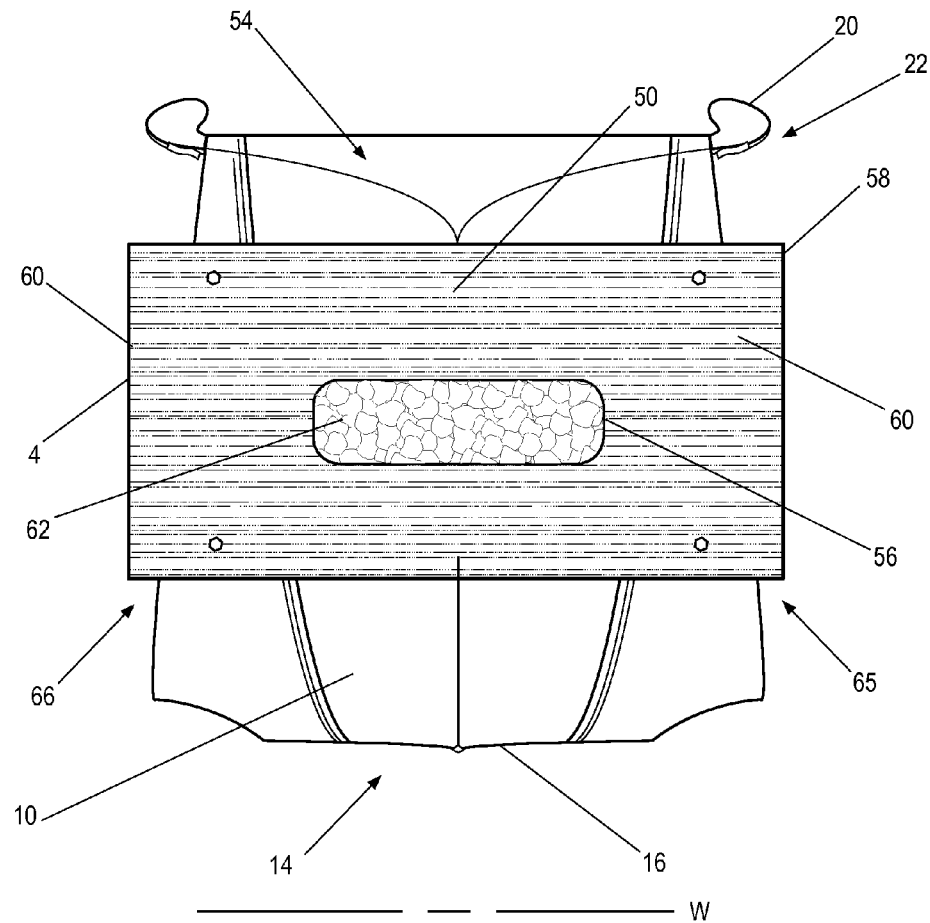
FIG. 5 is an illustration of a fourth preferred embodiment of the present invention, or fourth version, wherein the fourth version has a pillow section.
Figure 6:
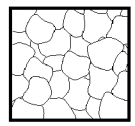
FIG. 6 is a cut away view of the fourth version of FIG. 5.
Figure 6:
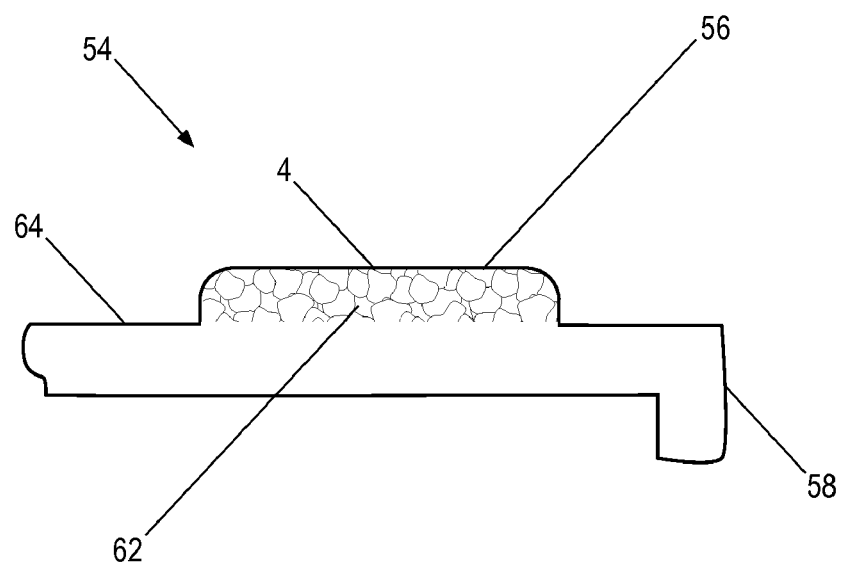

Referring now to the Figures and particularly to FIG. 2, FIG. 5 and FIG. 6, FIG. 5 is an illustration of a fourth preferred embodiment of the present invention 54, or fourth version 54, wherein the fourth version 54 has the fabric 4, a pillow section 56, a left overhang section 58, and a right overhang section 60. The pillow section 56 includes a stuffing 62 located between the top sheet 4A and the bottom sheet 4B. A thinned area 64 provides resting space for the animal while providing access to the animal to the pillow section 56. Conversely the animal, if appropriately sized, can wholly or partially rest or stand on the pillow section 56.

The left overhang section 58 of the fabric 4 covers a left side 65 of the vehicle 12 and protects the left side 65 from physical contact with the animal. The right overhang section 60 of the fabric 4 covers a right side 66 of the vehicle 12 and protects the right side 66 from physical contact with the animal.

Referring now to the FIG. 2, FIG. 5, and particularly to FIG. 6, FIG. 6 is a cut away view of the fourth version 54 of FIG. 5. The thicknesses of the fourth version 54 varies from the thinned area 64 to the pillow section 56.

It is understood that the term signage is defined herein to include a visual indication of a visual image that may be associated with an icon, a pictograph, a Chinese character, a symbol, a personality, a fictional character, a cartoon, a cartoon character, an actual person, an association, a sports team, a corporation, an association, a nation, a tribe, an ethnic group, a fan group, an affiliation, an emotion, an abstract principle, a goal, an institution, a union, a scientific concept, a religious belief, a religious group, a spiritual principle, or other concept, entity, object or being.

Figure 7:
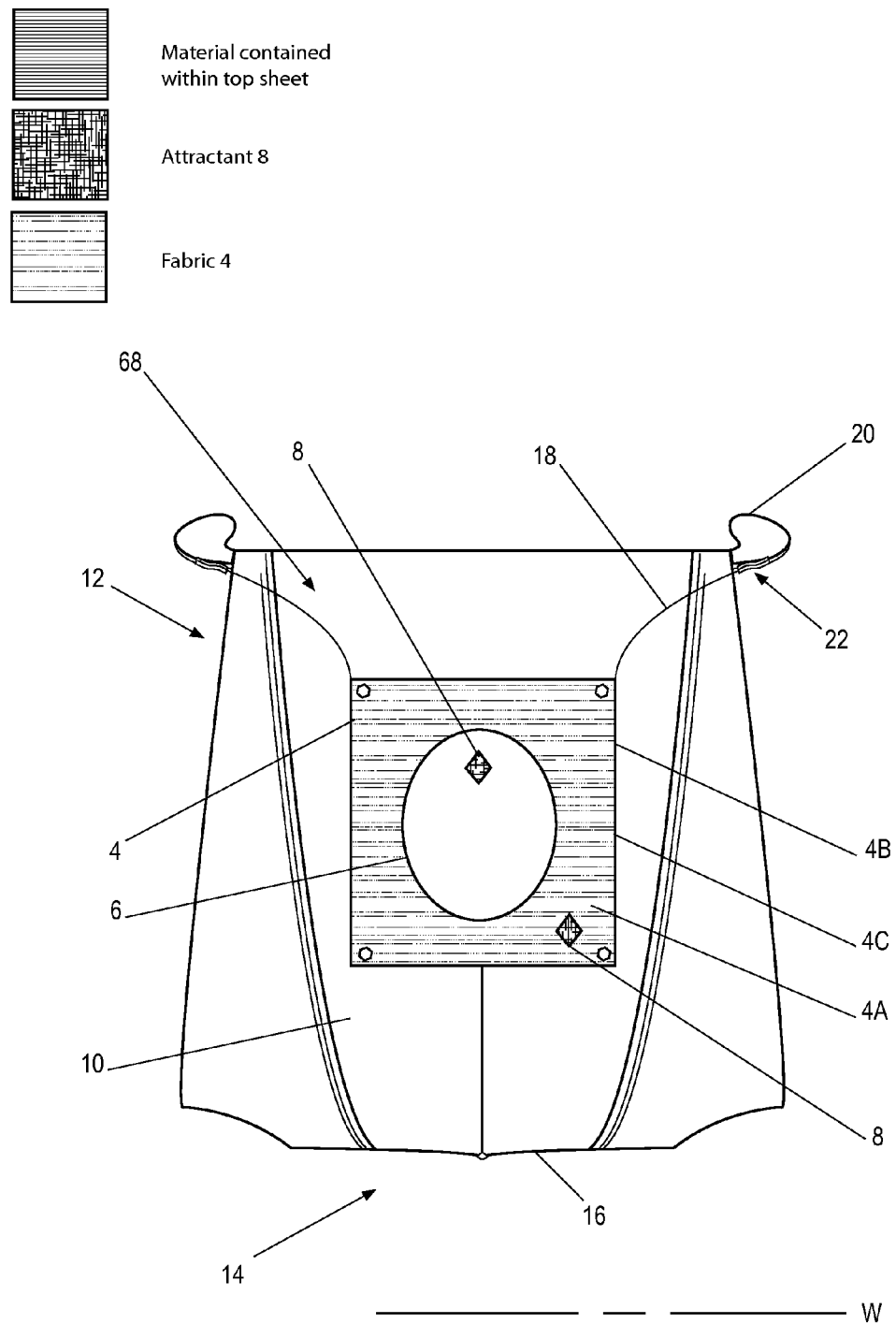
FIG. 7 is an illustration of a fifth preferred embodiment of the present invention, or fifth version.

Referring now to the Figures and particularly to FIG. 7, FIG. 7 is an illustration of a fifth preferred embodiment of the present invention 68, or fifth version 68. The fifth version 68 includes the fabric 4 made of cotton or felt, or other suitable fabric known in the art. The fabric 4 may optionally be, or include material 6, selected for being known in the art as pleasing to at least certain animals or many individual animals of selected species of animals, e.g., cats and dogs. The material 6 may be compressible and allow an animal to play with the material 6 and enjoy pressing down the material 6 and batting or pawing the material 6, such as a stuffing material trade named as CLUSTER STUFF, marketed by CREATE A CRAFT, or other suitable stuffing material known in the art. The fabric 4 may further additionally, alternatively or optionally include substances 8 known in the art to often or typically attract or be pleasing to certain animals or animal species. For example, substance 8 may be a natural or synthetic catnip, as known in the art and selected to attract and please a cat to lie upon and rest or play on the first version 2. The quality of the material 8 known in the art to be typically or occasionally pleasing to an animal of a selected species, such as a dog or a cat, may be a taste, a texture, and/or a smell. More particularly, the quality of the material 8 may be optionally be a tactile quality pleasing to a plurality of cats. The fabric 4 may be shaped substantially as a relatively thin, orthogonal sheet and having a thickness T (as measured along the T axis) of less than or greater than one inch, a width W (as measured along the W axis) of from less than one foot to ten feet, and a length L (as measured along the L axis) from less than one foot to ten foot. The thickness T is measured in an axis substantially orthogonal to both the axis W and the axis L of FIGS. 1, 4A, 5 and 7. The fabric 4 is preferably configured to cover at least part of the surface 10 of the vehicle 12, and in particular at least part of the surface front end 14 of the vehicle 12, to include the motor hood 16 of the front end 14. The strap 18 us attached to fabric 4 and extends from fabric 4 to the side view mirror housing 20 of the vehicle 12. The hook and loop fastener assembly 22 of the strap 18 is used to removabley secure the strap 18 about the mirror housing 20, and to thereby removabley attaché the first version 2 to the vehicle 12. The hook and loop fastener assembly 22 includes the hook strip 22A and the loop strip 22B, as shown in FIG. 1.

Where a motor (not shown) of the vehicle 12 is not located within or proximate to the front end 14, the first version may be configured to at least partially cover another part of surface 10 of the vehicle 12, such as where the surface 10 is proximate to a motor located within a rear end (not shown) of the vehicle 12, wherein the partial area of the surface 10 covered by the first version 2 is located proximate to the motor.

The fabric 4 may be shaped, or present a planar shape, as defined within a plane defined by the W and L axes, and present one of various shapes, to include a quadrilateral, a square, rectangular, a diamond-shape, round shape, a circle, an ellipsoid, a corporate logo or signage, or shaped like a cartoon character or other shape representative of an organization, association or other entity. The fabric 4 may further optionally include the optional surface 24 to display signage 26 or a logo, e.g., a cartoon, a team logo, an association logo, and a corporate symbol.

Those skilled in the art will appreciate that various adaptations and modifications of the just-described preferred embodiments can be configured without departing from the scope and spirit of the invention. Other suitable fabrication, manufacturing, assembly, and test techniques and methods known in the art can be applied in numerous specific modalities by one skilled in the art and in light of the description of the present invention described herein. Therefore, it is to be understood that the invention may be practiced other than as specifically described herein. The above description is intended to be illustrative, and not restrictive. Many other embodiments will be apparent to those of skill in the art upon reviewing the above description. The scope of the invention should, therefore, be determined with reference to the knowledge of one skilled in the art and in light of the disclosures presented above.

I claim:

1. A protective cover for a heat emitting automotive vehicle, comprising a flexible fabric and a looped strap, the flexible fabric comprising a material attractive to at least some animals, and the flexible fabric comprising a raised cushion area adapted to accept at least one animal, the flexible fabric configured for transferring heat from the heat emitting automotive vehicle to attract at least some animals, and the looped strap coupled with the flexible fabric and for detachably coupling the flexible fabric to a mirror housing of the automotive vehicle.

2. The cover of claim 1, wherein the fabric presents a sensual quality pleasant to at least a plurality of cats.

3. The cover of claim 1, wherein the flexible fabric presents a sensual quality pleasant to at least a plurality of dogs.

4. The cover of claim 1, wherein the fabric has a planar quadrilateral surface of about four feet by four feet.

5. The cover of claim 1, wherein the fabric further comprises a pillow section.

6. The cover of claim 1, wherein the fabric further comprises a planar surface having a shape selected from the group of shapes consisting of a quadrilateral, a rectangle, a diamond, a circle, and an ellipse.

7. The cover of claim 1, wherein the fabric is adapted for placement in a rolled up position.

8. A protective cover for a heat emitting automotive vehicle, comprising:
    a planar fabric and a pair of looped straps, the planar fabric transferring heat from the heat emitting vehicle to attract at least some animals, the planar fabric comprising a material emitting an odor pleasant to at least some animals and a raised cushion area adapted to accept at least one animal;
    each looped strap attached to the planar fabric and for removably coupling the planar fabric to an exterior feature of the automotive vehicle; and
    a strapping, the strapping attached to the planar fabric and for detachably securing the planar fabric to a feature of the automotive vehicle.

9. The cover of claim 8, wherein the fabric comprises a material emitting an odor pleasant to at least a plurality of cats.

10. A protective cover for a heat emitting automotive vehicle having a first and a second mirror housing, comprising:
    a fabric a first looped strap and a second looped strap, the fabric transferring heat from the heat emitting vehicle to attract at least some animals, the fabric comprising fleece;
    the first looped strap adapted for detachably coupling the fabric to the first mirror housing of the automotive vehicle;
    the second looped strap adapted for detachably coupling the fabric to the second mirror housing of the automotive vehicle; and
    a strapping, the strapping attached to the planar fabric and for detachably securing the planar fabric to an exterior feature of the automotive vehicle.

11. A protective cover for a heat emitting automotive vehicle, comprising:
    a fabric and an attachment means, the fabric transferring heat from the heat emitting structure to attract at least some animals and comprising a raised cushion area adapted to accept at least one animal, and the fabric having a planar shape selected from the group of shapes consisting of a cartoon character, a signage and a logo; and
    the attachment means coupled with the fabric and for detachably coupling fabric to an exterior feature of the vehicle.

12. The cover of claim 11, wherein the fabric is shaped as a signage.

13. A protective cover for a heat emitting automotive vehicle, comprising a fabric sheet and an attachment means, the fabric sheet transferring heat from the automotive vehicle to attract at least some animals, the fabric comprising a raised cushion area adapted to accept at least one animal, and the attachment means coupled with the fabric sheet and configured to removably couple the fabric sheet to a mirror housing of the vehicle, wherein the fabric sheet further comprises an aperture configured for removabley attaching the cover for storage by hanging.

14. A protective cover for a heat emitting automotive vehicle, the cover comprising:
    a fabric having a top sheet and a bottom sheet, the top sheet configured to attract and support an animal and the bottom sheet for application against an exterior surface of the automotive vehicle;
    a looped strap coupled with the fabric and for removably coupling of the fabric to a mirror housing of automotive vehicle; and a plurality of magnets, the plurality of magnets coupled with fabric, and the plurality of magnets positioned to enable removable attachment of the protective cover to a metallic element of the automotive vehicle.

15. The cover of claim 14, wherein the top sheet comprises a fabric comfortable to a plurality of cats.

16. The cover of claim 14, wherein the top sheet comprises a fabric comfortable to a plurality of dogs.

17. A cover for use as a cushion for a cat, the cover comprising:

a pad having a top and an opposing bottom, the top forming a cat engaging surface whereon the cat can lie in direct engagement with the top of the pad; and a plurality of magnets, the plurality of magnets coupled with the pad, and the plurality of magnets positioned to enable removable attachment of the cover to a metallic hood of a vehicle.

18. The cover of claim 17, wherein the pad is configured for placement proximate to a heat emitting equipment of a vehicle.

19. The cover of claim 18, wherein the pad is configured for placement proximate to a protective hood of the heat emitting equipment, whereby the cat may receive heat emitted by the equipment when the cat is proximate to the cover.

* * * * *